United States Patent
Park et al.

(10) Patent No.: US 8,130,028 B2
(45) Date of Patent: Mar. 6, 2012

(54) CMOS CHARGE PUMP WITH IMPROVED LATCH-UP IMMUNITY

(75) Inventors: Su-Jin Park, Hwaseung-si (KR);
Joung-Yeal Kim, Yongin-si (KR);
Bai-Sun Kong, Suwon-si (KR);
Young-Hyun Jun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 14 days.

(21) Appl. No.: 12/691,937

(22) Filed: Jan. 22, 2010

(65) Prior Publication Data

US 2010/0207684 A1     Aug. 19, 2010

(30) Foreign Application Priority Data

Feb. 19, 2009   (KR) .................. 10-2009-0013939

(51) Int. Cl.
*G05F 3/02* (2006.01)
(52) U.S. Cl. .......... 327/536; 327/51; 327/198; 365/203; 363/59
(58) Field of Classification Search ............ 327/51, 327/198–201, 291–299, 536; 365/203, 205, 365/207; 363/59–60
See application file for complete search history.

(56) References Cited

U.S. PATENT DOCUMENTS

| | | | | |
|---|---|---|---|---|
| 5,889,664 | A * | 3/1999 | Oh | 363/60 |
| 6,437,637 | B2 | 8/2002 | Myono | |
| 7,333,373 | B2 | 2/2008 | You et al. | |
| 2003/0016565 | A1 * | 1/2003 | Jang et al. | 365/189.09 |
| 2005/0055220 | A1 | 4/2005 | Hahn et al. | |
| 2005/0088220 | A1 | 4/2005 | Hahn et al. | |

FOREIGN PATENT DOCUMENTS

| | | |
|---|---|---|
| JP | 2002-058237 | 2/2002 |
| JP | 2005-130697 | 5/2005 |
| JP | 2006-060995 | 3/2006 |
| KR | 1020010109128 | 12/2001 |
| KR | 1020050040072 | 5/2005 |
| KR | 1020060018047 | 2/2006 |

OTHER PUBLICATIONS

CMOS Cross-Coupled Charge Pump with Improved Latch-up Immunity; Su-Jin Park,Joung-Yeal Kim, Young-Hyun Jun Bai-Sun Kong,School of Information and Communication Engineering Sungkyunkwan University, Suwon, Korea DRAM Design, Memory Division, Samsung Electronics, Hwasung, Korea. IEICE Electronics Express, pp. 1-6, Oct. 2008.* A Novel CMOS Cross-Coupled Charge Pump with Improved Latch-up Immunity; Su-Jin Park,Joung-Yeal Kim, Young-Hyun Jun Bai-Sun Kong,School of Information and Communication Engineering Sungkyunkwan University, Suwon, Korea DRAM Design, Memory Division, Samsung Electronics, Hwasung, Korea (4 pages).
CMOS Cross-Coupled Charge Pump with Improved Latch-up Immunity; Su-Jin Park,Joung-Yeal Kim, Young-Hyun Jun Bai-Sun Kong, School of Information and Communication Engineering Sungkyunkwan University, Suwon, Korea DRAM Design, Memory Division, Samsung Electronics, Hwasung, Korea. IEICE Electronics Express, pp. 1-6.

* cited by examiner

*Primary Examiner* — Lincoln Donovan
*Assistant Examiner* — Shikha Goyal
(74) *Attorney, Agent, or Firm* — F. Chau & Associates, LLC

(57) ABSTRACT

A CMOS charge pump with improved latch-up immunity is provided. The CMOS charge pump includes a blocking transistor that disconnects first and second boost nodes from a bulk node in response to a blocking control signal, such that a bulk voltage can be maintained at a predetermined level or higher. The CMOS charge pump in a power-up period first precharges the bulk voltage before the main pump performs a boosting operation and prevents a latch-up phenomenon.

15 Claims, 4 Drawing Sheets

CMOS CHARGE PUMP WITH IMPROVED LATCH-UP IMMUNITY

CROSS-REFERENCE TO RELATED APPLICATION

This application claims under 35 U.S.C. §119 priority to and the benefit of Korean Patent Application No. 10-2009-0013939, filed on Feb. 19, 2009, the entire contents of which is incorporated by reference herein.

BACKGROUND

1. Technical Field

The present disclosure relates to charge pumps, and more particularly to a complementary metal-oxide semiconductor (CMOS) charge pump with improved latch-up immunity.

2. Discussion of Related Art

As line widths become increasingly reduced in CMOS processing, lower power supply voltages are used. The low power supply voltage is a significant factor in resolving reliability issues for low-power integrated circuit devices. However, not all circuits in an integrated circuit device always operate only with a low power supply voltage. Accordingly, there is a need for circuits that receive a low power supply voltage and that generate a high output voltage, which is typically done by using a CMOS charge pump. As such, high-performance CMOS charge pumps play a significant role in integrated circuit devices.

A CMOS charge pump normally receives a clock or phase signal for operation, boosts a voltage using a capacitor, and transfers a boosted voltage to an output terminal via a transfer switch. Current consumption occurs at an external load connected to the output terminal, causing an output voltage drop from the boosted voltage. Accordingly, the CMOS charge pump needs to constantly supply the boosted voltage even with such current consumption.

The CMOS charge pump typically employs NMOS or PMOS transistors as transfer switches. In the NMOS-type charge pump, charges are transferred from an input to an output at a high transfer speed. However, transfer loss can be caused by a threshold voltage of an NMOS transistor, thereby degrading output efficiency.

On the other hand, the PMOS-type charge pump may transfer the boosted voltage to an output terminal without a voltage drop caused by a threshold voltage. Among PMOS-type charge pumps, a cross-coupled charge pump includes a direct connection of a bulk of PMOS transistor and an output node, such that a bulk voltage varies with an output voltage. In a CMOS device, the flow of leakage current into a bulk can cause a latch-up phenomenon, as well as normal current loss, which has a fatal influence on the reliability of products.

While the NMOS-type charge pump can easily transfer a low voltage at a high transfer speed, it suffers from high-voltage transfer loss caused by a threshold voltage. On the other hand, a charge pump using PMOS transistors as transfer switches can transfer a high voltage without a threshold-voltage loss, but with a low transfer speed, and can cause a latch-up phenomenon due to leakage current flowing into the bulk.

SUMMARY

Exemplary embodiments provide a complementary metal-oxide semiconductor (CMOS) charge pump with improved latch-up immunity.

In accordance with an exemplary embodiment CMOS charge pump includes a main pump. The main pump includes a boosting circuit configured to boost voltages at first and second boost nodes in response to a main pumping signal and an inverted main pumping signal. An output unit is configured to output a boosted voltage, and includes a first transfer PMOS transistor that applies the voltage at the first boost node to an output node in response to a voltage level of the second boost node and a second transfer PMOS transistor that applies the voltage at the second boost node to the output node in response to a voltage level of the first boost node. A bulk voltage adjustor is configured to electrically connect a bulk node connected to bulks of the first and second transfer PMOS transistors to the output node in response to the voltage levels of the first boost node and the second boost node when a blocking control signal is deactivated, and to disconnect the first boost node and the second boost node from the bulk node when the blocking control signal is activated.

The bulk voltage adjustor may connect the first boost node to the bulk node when the blocking control signal is deactivated and the voltage at the first boost node is higher than the voltage at the second boost node, and may connect the second boost node to the bulk node when the blocking control signal is deactivated and the voltage at the second boost node is higher than the voltage at the first boost node.

The bulk voltage adjustor may include a first bulk control transistor having one terminal connected to the bulk node and a gate connected to the second boost node, a second bulk control transistor having one terminal connected to the bulk node and a gate connected to the first boost node, a first blocking transistor connected between the first boost node and the first bulk control transistor and having a gate receiving the blocking signal, and a second blocking transistor connected between the second boost node and the second bulk control transistor and having a gate receiving the blocking signal.

The first bulk control transistor, the second bulk control transistor, the first blocking transistor and the second blocking transistor may each be PMOS transistors.

Bulks of the first and second bulk control transistors and the first and second blocking transistors may be connected to the bulk node.

The CMOS charge pump may further include an auxiliary pump configured to precharge the bulk node in response to an auxiliary pumping signal, an inverted auxiliary pumping signal and a pulse auxiliary pumping signal and activate the blocking signal when the level of the boosted voltage is lower than a predetermined level.

The boosting circuit may include a first precharge transistor connected between a power supply voltage and the first boost node and having a gate connected to the second boost node, a second precharge transistor connected between the power supply voltage and the second boost node and having a gate connected to the first boost node, a first boost capacitor having one terminal connected to the first boost node and the other terminal receiving the main pumping signal, and a second boost capacitor having one terminal connected to the second boost node and the other terminal receiving the inverted main pumping signal.

The first precharge transistor and the second precharge transistor may be NMOS transistors.

The auxiliary pump may include a first auxiliary precharge transistor connected between the power supply voltage and a first auxiliary boost node and having a gate connected to a second auxiliary boost node, a second auxiliary precharge transistor connected between the power supply voltage and the second auxiliary boost node and having a gate connected to the first auxiliary boost node, a first auxiliary capacitor having one terminal connected to the first auxiliary boost node and the other terminal receiving the auxiliary pumping signal, a second auxiliary capacitor having one terminal connected to the second auxiliary boost node and the other terminal receiving the inverted auxiliary pumping signal, a blocking signal output transistor having one terminal and a gate connected to the first auxiliary boost node and the other terminal outputting the blocking signal, a bulk voltage output transistor connected between the first auxiliary boost node and the bulk node and precharging the bulk node, a third auxiliary capacitor having one terminal connected to a gate of the bulk voltage output transistor and the other terminal receiving the pulse auxiliary pumping signal, and a transfer gate connected between the first auxiliary boost node and the gate of the bulk voltage output transistor and implemented by two NMOS transistors having respective gates connected to the first and second auxiliary boost node.

The first auxiliary precharge transistor, the second auxiliary precharge transistor, the blocking signal output transistor and the bulk voltage output transistor may each be NMOS transistors.

The CMOS charge pump may further include a control signal generator. The control signal generator may include a first level sensor configured to sense a voltage level of the boosted voltage and output a clock enable signal, a clock signal generator configured to generate and output a clock signal in response to the clock enable signal, a second level sensor configured to sense the voltage level of the boosted voltage and output an auxiliary circuit enable signal, a first AND gate configured to perform an AND operation on an inverted initialization signal and the clock signal and output the main pumping signal, the inverted initialization signal transitioning to a high level in a predetermined time after the power supply voltage is applied to the CMOS charge pump, a first inverter configured to invert the main pumping signal and output the inverted main pumping signal, a second AND gate configured to perform an AND operation on the auxiliary circuit enable signal and the clock signal and output the auxiliary pumping signal, a second inverter configured to invert the auxiliary pumping signal and output the inverted auxiliary pumping signal, a delay element configured to delay the auxiliary pumping signal, a third inverter configured to invert an output signal of the delay element, and a third AND gate configured to perform an AND operation on the auxiliary pumping signal and the output signal of the third inverter and output the pulse pumping signal.

The CMOS charge pump may further include a blocking control circuit. The blocking control circuit may include a fourth inverter configured to invert the auxiliary circuit enable signal, a first PMOS transistor having one terminal connected to the power supply voltage and the other terminal outputting the blocking control signal, a second PMOS transistor having one terminal connected to the other terminal of the first PMOS transistor, the other terminal connected to the gate of the first PMOS transistor, and a gate receiving an output signal of the fourth inverter, a first NMOS transistor having one terminal connected to the other terminal of the second PMOS transistor, and a gate connected to the power supply voltage, and a second NMOS transistor connected between the first NMOS transistor and a ground voltage and having a gate receiving an output signal of the fourth inverter.

The CMOS charge pump may further include an output capacitor connected between the output node and the ground voltage, and a bulk capacitor connected between the bulk node and the ground voltage.

In accordance with an exemplary embodiment, a CMOS charge pump includes a main charge pump having an output node for providing a boosted voltage, an auxiliary charge pump coupled to the main charge pump, and a control signal generator for providing respective control signals to the main charge pump and to the auxiliary charge pump. The main charge pump includes first and second boost nodes coupled to the output node, a bulk node coupled to the output node, and a blocking transistor configured to disconnect the first and second boost nodes from the bulk node in response to a blocking control signal from the auxiliary charge pump, such that a bulk voltage at the bulk node can be maintained at a predetermined level or higher.

The auxiliary charge pump may in a power-up period pre-charge the bulk voltage before the main charge pump performs a boosting operation.

BRIEF DESCRIPTION OF THE DRAWINGS

Exemplary embodiments of the inventive concept are described in further detail below with reference to the accompanying drawings. It should be understood that various aspects of the drawings may have been exaggerated for clarity.

DETAILED DESCRIPTION OF THE EMBODIMENTS

Detailed illustrative embodiments are disclosed herein. However, specific structural and functional details disclosed herein are merely representative for purposes of describing exemplary embodiments. This inventive concept, however, may be embodied in many alternate forms and should not be construed as limited to only exemplary embodiments set forth herein. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments.

It will be understood that when an element is referred to as being "connected" or "coupled" to another element, it can be directly connected or coupled to the other element or intervening elements may be present.

Figure 1:
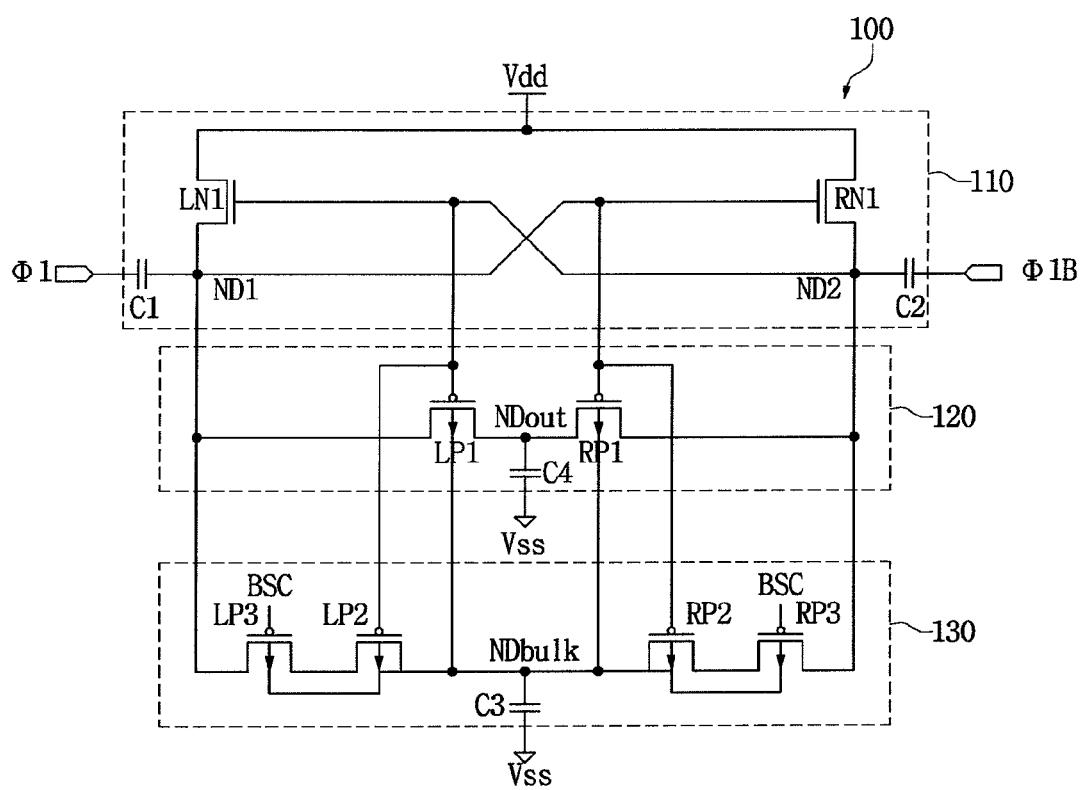
FIG. 1 illustrates a main pump for a CMOS charge pump according to an exemplary embodiment of the inventive concept.

FIG. 1 illustrates an example of a main pump in a CMOS charge pump according to the inventive concept. In FIG. 1, the main pump 100 includes a boosting circuit 110 boosting voltages at first and second boost nodes ND1, ND2 in response to a main pumping signal $\Phi 1$ and an inverted main pumping signal $\Phi 1B$, an output unit 120 outputting a boosted voltage Vout to an output node NDout by charge-sharing the voltages at the first and second boost nodes ND1, ND2 with the output node NDout in response to voltage levels of the first and second boost nodes ND1, ND2, and a bulk voltage adjustor 130 adjusting a bulk voltage Vbulk in response to a blocking signal BSC and the voltage levels of the first and second boost nodes ND1, ND2 and outputting the adjusted bulk voltage to a bulk node NDbulk.

The boosting circuit 110 includes a first precharge transistor LN1 connected between a power supply voltage Vdd and the first boost node ND1 and having a gate connected to the second boost node ND2, and a second precharge transistor RN1 connected between the power supply voltage Vdd and the second boost node ND2 and having a gate connected to the first boost node ND1. Here, the first and second precharge transistors LN1 and RN1 are NMOS transistors. The first precharge transistor LN1 precharges the first boost node ND1 to a level of the power supply voltage Vdd in response to a voltage level of the second boost node ND2, and the second precharge transistor RN1 precharges the second boost node ND2 to the power supply voltage level in response to a voltage level of the first boost node ND1.

The boosting circuit 110 further includes a first boost capacitor C1 having one terminal connected to the first boost node ND1 and the other terminal receiving a main pumping signal Φ1, and a second boost capacitor C2 having one terminal connected to the second boost node ND2 and the other terminal receiving an inverted main pumping signal Φ1B. When high levels of the main pumping signal Φ1 and the inverted main pumping signal Φ1B are equal to the power supply voltage level, the first and second boost capacitors C1, C2 boost the voltages at the first and second boost nodes ND1, ND2 to a level of double the power supply voltage (2Vdd) in response to the main pumping signal Φ1 and the inverted main pumping signal Φ1B.

The output unit 120 includes a first transfer transistor LP1 connected between the first boost node ND1 and the output node NDout and having a gate connected to the second boost node ND2, and a second transfer transistor RP1 connected between the second boost node ND2 and the output node NDout and having a gate connected to the first boost node ND1. The first and second transfer transistors LP1, RP1 are PMOS transistors. The first transfer transistor LP1 connects the first boost node ND1 to the output node NDout in response to the voltage level of the second boost node ND2, such that the voltage at the first boost node ND1 boosted by the main pumping signal Φ1 is output to the output node NDout. The second transfer transistor RP1 connects the second boost node ND2 to the output node NDout in response to the voltage level of the first boost node ND1, such that the voltage at the second boost node ND2 boosted by the inverted main pumping signal Φ1B is output to the output node NDout. Since the first and second transfer transistors LP1, RP1 are PMOS transistors, the boosted voltages at the first and second boost nodes ND1, ND2 can be output to the output node NDout as the boosted voltage Vout without voltage drop caused by a threshold voltage. Bulks of the first and second transfer transistors LP1, RP1 are connected to the bulk node NDbulk.

The output unit 120 further includes an output capacitor C4 connected between the output node NDout and the ground voltage Vss to stabilize the boosted voltage Vout output via the output node NDout.

The bulk voltage adjustor 130 includes two PMOS transistors LP2, LP3 connected in series between the first boost node ND1 and the bulk node NDbulk, and two PMOS transistors RP2, RP3 connected in series between the second boost node ND2 and the bulk node NDbulk. The first bulk control transistor LP2 has one terminal connected to the bulk node NDbulk and a gate connected to the second boost node ND2, and the second bulk control transistor RP2 has one terminal connected to the bulk node NDbulk and a gate connected to the first boost node ND1. The first and second bulk control transistors LP2, RP2 are activated in response to the voltage levels of the second and first boost nodes ND2, ND1 and apply the voltages at the first and second boost nodes ND1, ND2, which are boosted by the main pumping signal Φ1 and the inverted main pumping signal Φ1B, to the bulk node Ndbulk, respectively. The first blocking transistor LP3 is connected between the first boost node ND1 and the first bulk control transistor LP2 and has a gate receiving the blocking signal BSC, and the second blocking transistor RP3 is connected between the second boost node ND2 and the second bulk control transistor RP2 and has a gate receiving the blocking signal BSC, as does the first blocking transistor LP3. The first and second blocking transistors LP3, RP3 are deactivated in response to the blocking signal BSC to disconnect the output node NDout from the bulk node NDbulk, such that the voltage level of the bulk node Ndbulk can be stabilized irrespective of a variation of the boosted voltage Vout. Bulks of the first and second bulk control PMOS transistors LP2, RP2 and the first and second blocking transistors LP3, RP3 are connected to the bulk node Ndbulk, as in the first and second transfer transistors LP1, RP1.

The bulk voltage adjustor 130 further includes a bulk capacitor C3 connected between the bulk node NDbulk and the ground voltage Vss to stabilize the bulk voltage Vbulk output via the bulk node NDbulk.

In the first and second transfer transistors LP1, RP1 of the output unit 130 in FIG. 1, when a level of a voltage applied to the bulk (that is a well or a substrate) is lower than that of a voltage applied to a source or a drain, a forward bias is formed between the source and the bulk or between the drain and the bulk. Accordingly, a large current may flow into the bulk, causing a latch-up phenomenon. Therefore, the voltages at the bulks of the first and second transfer transistors LP1, RP1 need to be maintained higher than or equal to a source or drain voltage. As a result, the voltage level of the bulk node Ndbulk needs to be higher than or equal to the highest voltage level at any of the first and second boost nodes ND1, ND2 and the output node NDout. Since the latch-up phenomenon may occur at all PMOS transistors in the main pump 100, as well as the first and second transfer transistors LP1, RP1, the bulks of the first and second bulk control PMOS transistors LP2, RP2 and the first and second blocking transistors LP3, RP3 according to an exemplary embodiment of the inventive concept are all connected to the bulk node NDbulk.

Since the gate of the first bulk control transistor LP2 is connected to the second boost node ND2 with the gate of the first transfer transistor LP1 and the gate of the second bulk control transistor RP2 is connected to the first boost node ND1 with the gate of the second transfer transistor RP1, the first bulk control transistor LP2 and the first transfer transistor LP1 are activated/deactivated simultaneously, and the second bulk control transistor RP2 and the second transfer transistor RP1 are activated/deactivated simultaneously.

If the bulk voltage adjustor 130 does not include the blocking transistors LP3, RP3, the bulk node NDbulk is electrically connected to the output node NDout when one of the first and second transfer transistors LP1, RP1 is activated. Accordingly, the boosted voltage Vout and the bulk voltage Vbulk have the same voltage level, and the voltage level of the boosted voltage Vout output to an external load via the output node NDout varies with a size of the load. Since the boosted voltage Vout and the bulk voltage Vbulk have the same voltage level, a variation of the boosted voltage Vout results in a variation of the bulk voltage Vbulk, which may cause the latch-up phenomenon described above.

The first and second blocking transistors LP3, RP3 in accordance with an exemplary embodiment of the inventive concept adjust the period in which the bulk node NDbulk is electrically connected to the output node NDout, in response to the blocking signal BSC, such that the bulk voltage Vbulk can be stabilized irrespective of a variation of the boosted voltage Vout.

The above-described function of the above-described blocking transistors LP3, RP3 was considered for a period in which the level of the boosted voltage Vout is changed due to a great load in a normal period of operation in which the main pump 100 stably outputs the boosted voltage Vout. However, the voltage levels of the first and second boost nodes ND1, ND2 and the output node NDout are all low in an initial power-up operation of the main pump 100. Accordingly, if the first and second transfer transistors LP1, RP1 and the first and second bulk control transistors LP2, RP2 have all been activated and the first and second blocking transistors LP3, RP3 have been activated, the bulk voltage Vbulk has the same level as the ground voltage Vss. Accordingly, the first and second blocking transistors LP3, RP3 need to be deactivated even at initial power-up of the main pump 100 to disconnect the output node NDout from the bulk node NDbulk. However, the bulk voltage Vbulk cannot be boosted due to such disconnection at power up.

Figure 2:
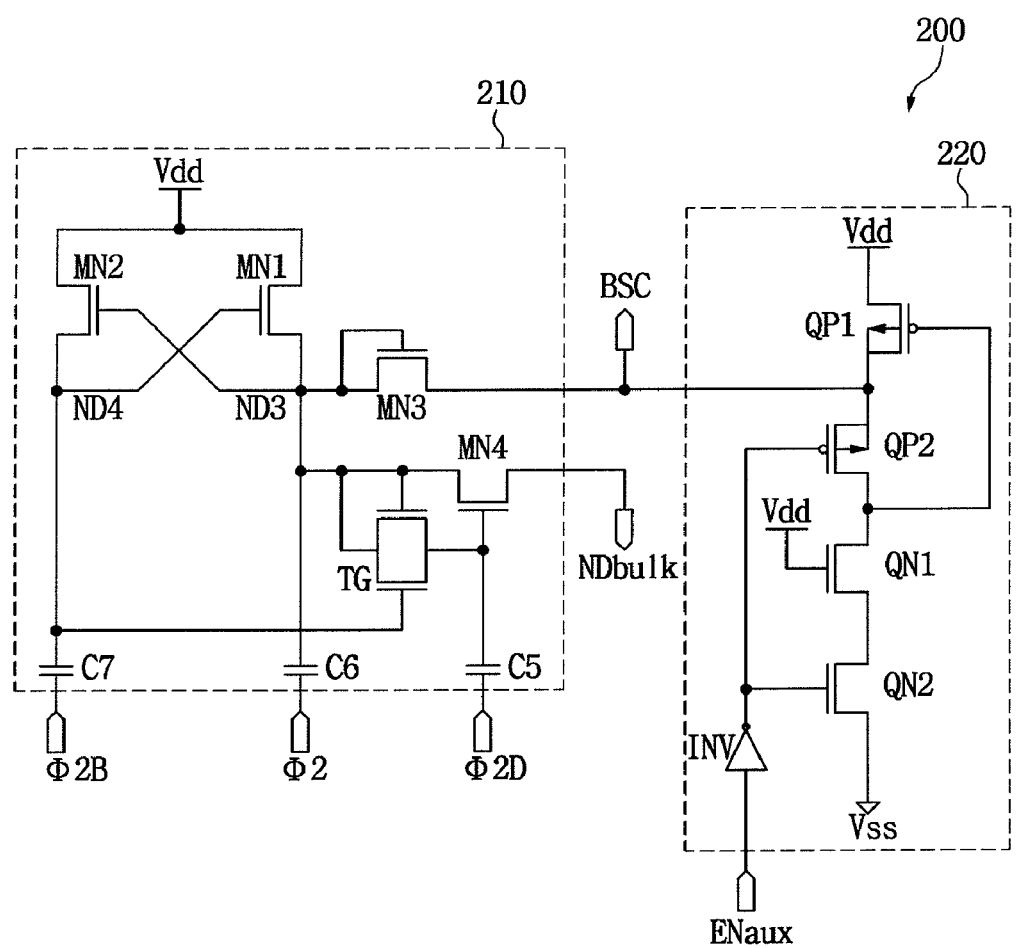
FIG. 2 illustrates an auxiliary circuit for the main pump of FIG. 1.

FIG. 2 illustrates an exemplary embodiment of an auxiliary circuit for the main pump in FIG. 1. In FIG. 2, the auxiliary circuit 200 includes an auxiliary pump 210 and a blocking control circuit 220. The auxiliary pump 210 precharges the bulk node NDbulk of the main pump 100 and activates the blocking signal BSC to a predetermined voltage level, and the blocking control circuit 220 prevents the blocking signal BSC from being in a floating state.

In FIG. 2, the auxiliary pump 210 is implemented by NMOS transistors such that a latch-up phenomenon caused by a bulk forward issue does not occur. The auxiliary pump 210 includes an auxiliary boosting circuit boosting first and second auxiliary boost nodes ND3, ND4 in response to an auxiliary pumping signal Φ2 and an inverted auxiliary pumping signal Φ2B, and an auxiliary output unit outputting the blocking signal BSC and a precharge bulk voltage Vbulk to the bulk node NDbulk of the main pump 100 in response to voltage levels of the first and second auxiliary boost nodes ND3, ND4. The auxiliary pump 210 implemented by the NMOS transistors as described above does not suffer from the bulk forward issue, and does not require a bulk voltage adjustor, unlike the main pump 100. The auxiliary boosting circuit includes a first auxiliary precharge transistor MN1 connected between a power supply voltage Vdd and the first auxiliary boost node ND3 and having a gate connected to the second auxiliary boost node ND4, and a second auxiliary precharge transistor MN2 connected between the power supply voltage Vdd and the second auxiliary boost node ND4 and having a gate connected to the first auxiliary boost node ND3, similar to the boosting circuit 110 in FIG. 1. The first and second auxiliary precharge transistors MN1, MN2 are NMOS transistors. The first auxiliary precharge transistor MN1 precharges a voltage at the first auxiliary boost node ND3 to the level of the power supply voltage Vdd in response to the voltage level of the second auxiliary boost node ND4, and the second auxiliary precharge transistor MN2 precharges a voltage at the second auxiliary boost node ND4 to the power supply voltage level in response to the voltage level of the first auxiliary boost node ND3.

The auxiliary boosting circuit further includes a first auxiliary capacitor C6 having one terminal connected to the first auxiliary boost node ND3 and the other terminal receiving the auxiliary pumping signal Φ2, and a second auxiliary capacitor C7 having one terminal connected to the second auxiliary boost node ND4 and the other terminal receiving the inverted auxiliary pumping signal Φ2B. When high levels of the auxiliary pumping signal Φ2 and the inverted auxiliary pumping signal Φ2B are equal to the power supply voltage level, the first and second auxiliary capacitors C6, C7 boost the voltages at the first and second auxiliary boost nodes ND3, ND4 to a level of a double power supply voltage 2Vdd in response to the auxiliary pumping signal Φ2 and the inverted auxiliary pumping signal Φ2B, respectively.

The auxiliary output unit includes a blocking-signal output unit outputting the blocking signal BSC in response to the voltage level of the first auxiliary boost node ND3, and a bulk-voltage output unit outputting a precharge bulk voltage to precharge the bulk node NDbulk of the main pump 100 in response to the voltage levels of the first and second auxiliary boost nodes ND3, ND4 and the pulse auxiliary pumping signal Φ2D. The blocking-signal output unit includes a blocking-signal output transistor MN3 having one terminal and a gate connected to the first auxiliary boost node ND3 in common, and the other terminal outputting the blocking signal BSC in response to the voltage level of the first auxiliary boost node ND3. Since the blocking-signal output transistor MN3 is implemented by an NMOS transistor, when a boosted voltage at the first auxiliary boost node ND3 is applied, the blocking signal BSC is output at a level lower by a threshold voltage Vthn of the blocking-signal output transistor MN3 than the boosted voltage.

The bulk-voltage output unit includes a bulk-voltage output transistor MN4 having one terminal connected to the first auxiliary boost node ND3 and the other terminal outputting a precharge bulk voltage, a transfer gate TG connected between the first auxiliary boost node ND3 and the gate of the bulk-voltage output transistor MN4 and implemented by two NMOS transistors having respective gates connected to the first and second auxiliary boost nodes ND3, ND4, and a third auxiliary capacitor C5 having one terminal connected to the gate of the bulk-voltage output transistor MN4 and the other terminal receiving the pulse auxiliary pumping signal Φ2D.

The transfer gate TG applies a voltage obtained by subtracting a threshold voltage Vthn from the voltage at the first auxiliary boost node ND3 to the gate of the bulk-voltage output transistor MN4 in response to the voltage level of the first or second auxiliary boost node ND3 or ND4, but the third auxiliary capacitor C5 additionally applies a voltage corresponding to the pulse auxiliary pumping signal Φ2D to the gate of the bulk-voltage output transistor MN4. As a result, the bulk-voltage output transistor MN4 can transfer the voltage level of the first auxiliary boost node ND3 as a precharge bulk voltage to the bulk node NDbulk without voltage loss caused by the threshold voltage Vthn.

The blocking control circuit 220 includes two PMOS transistors QP1, QP2 and two NMOS transistors QN1, QN2 connected in series between the power supply voltage Vdd and the ground voltage Vss, and an inverter INV that inverts an auxiliary circuit enable signal ENaux and outputs an inverted auxiliary circuit enable signal. The PMOS transistor QP1 has one terminal connected to the power supply voltage Vdd and the other terminal outputting the blocking signal BSC. The PMOS transistor QP2 has one terminal connected to the PMOS transistor QP1 and the other terminal connected to the gate of the PMOS transistor QP1 and one terminal of the NMOS transistor QN1. The NMOS transistor QN1 has one terminal connected to the PMOS transistor QP2 and a gate receiving the power supply voltage Vdd so that the NMOS transistor QN1 can always be turned on. The NMOS transistor QN2 is connected between the NMOS transistor QN1 and the ground voltage Vss. The inverted auxiliary circuit enable signal is applied to gates of the PMOS transistor QP2 and the NMOS transistor QN2 in common. The blocking signal BSC is applied to the bulks of the two PMOS transistors QP1, QP2 to prevent a latch-up phenomenon.

Since the blocking signal BSC from the auxiliary pump 210 is applied to the gates of the first and second blocking transistors LP3, RP3 in the main pump, when the voltage level of the first auxiliary boost node ND3 is lowered and the blocking-signal output transistor MN3 is not turned on, the blocking signal BSC enters a floating state. Accordingly, a stable operation of the first and second blocking transistors LP3, RP3 might not be obtained. In an exemplary embodiment of the inventive concept, the blocking control circuit 220 is included to prevent the blocking signal BSC from being in a floating state. In other embodiments, the blocking control circuit 220 may not be included.

Figure 3:
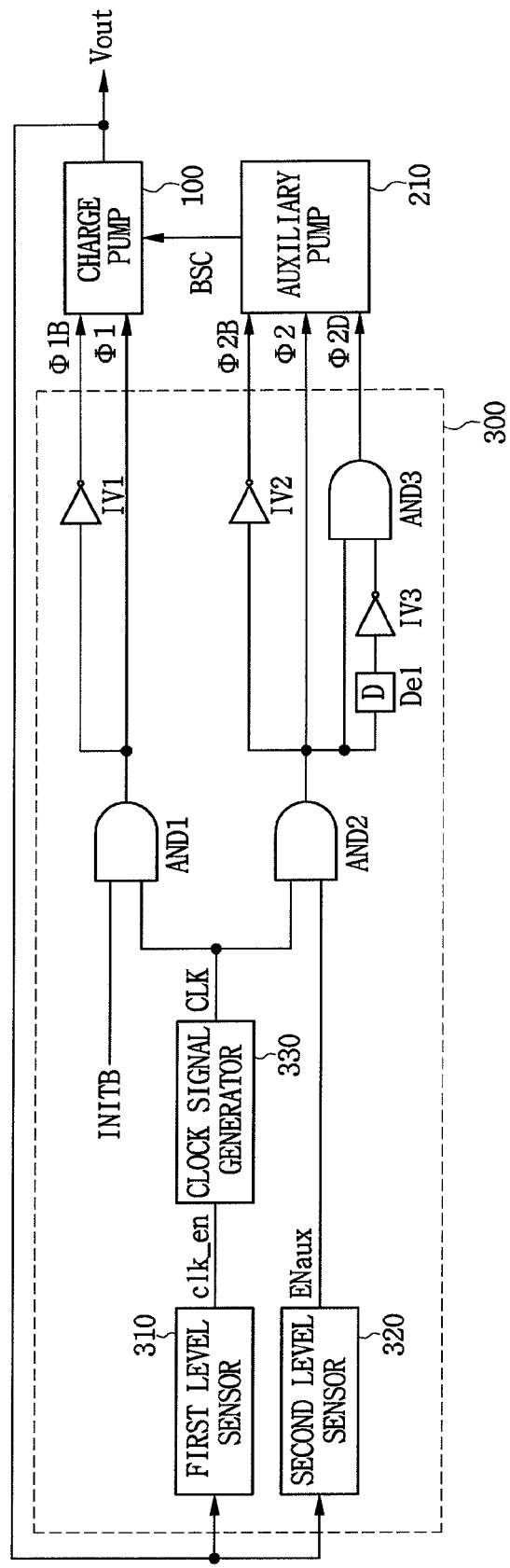
FIG. 3 illustrates a control signal generator that generates a signal to control the main pump and the auxiliary circuit of FIGS. 1 and 2.

FIG. 3 illustrates an exemplary embodiment of a control signal generator that generates a signal to control the main pump and the auxiliary circuit of FIGS. 1 and 2.

In FIG. 3, the control signal generator 300 includes first and second level sensors 310, 320 that sense the voltage level of the boosted voltage Vout. When the voltage level of the boosted voltage Vout drops below a level of 2Vdd, the first level sensor 310 activates a clock enable signal clk_en. When the voltage level of the boosted voltage Vout drops below a level of 2Vdd−Vthn, the second level sensor 320 activates an auxiliary circuit enable signal ENaux. A clock signal generator 330 generates and outputs a clock signal CLK in response to the clock enable signal clk_en. The clock signal generator 330 may be implemented by an oscillator.

An inverted initialization signal INITB is transitioned to a high level in a predetermined time when the power supply voltage Vdd is applied. Here, the predetermined time corresponds to a power-up period of operation (t0 to t1) of the CMOS charge pump.

An AND gate AND1 performs an AND operation on the inverted initialization signal INITB and the clock signal CLK and outputs the main pumping signal Φ1 to the main charge pump 100, and the inverter IV1 inverts the main pumping signal Φ1 and outputs the inverted main pumping signal Φ1B to the main charge pump 100. An AND gate AND2 performs an AND operation on the auxiliary circuit enable signal ENaux and the clock signal CLK and outputs the auxiliary pumping signal Φ2 to the auxiliary pump 210, and an inverter IV2 inverts the auxiliary pumping signal Φ2 and outputs the inverted auxiliary pumping signal Φ2B to the auxiliary pump 210. A delay element Del delays the auxiliary pumping signal Φ2 by a predetermined time, and an inverter IV3 inverts the delayed auxiliary pumping signal. An AND gate AND3 performs an AND operation on the auxiliary pumping signal Φ2 and the inverted delayed auxiliary pumping signal and outputs a pulse auxiliary pumping signal Φ2D to the auxiliary pump 210.

Although not shown, the second level sensor 320 outputs the auxiliary circuit enable signal ENaux to the blocking control circuit 220.

Figure 4:
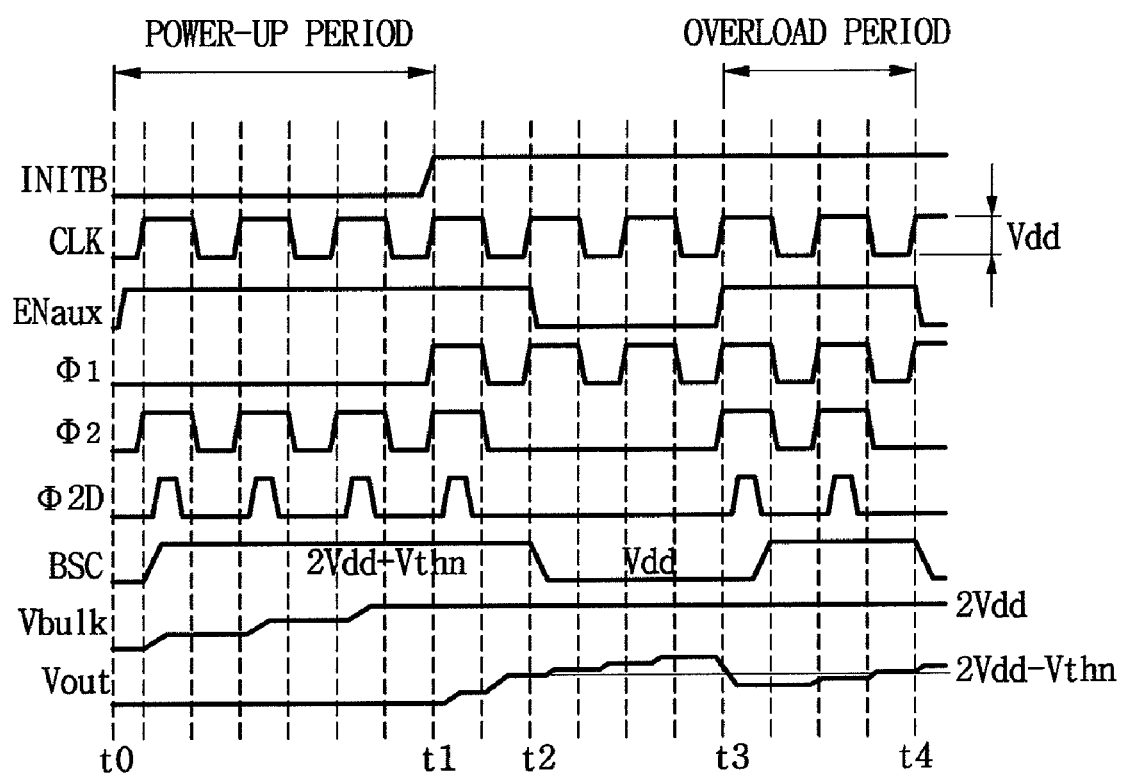
FIG. 4 is a timing diagram illustrating an example of operation of the CMOS charge pump according to an exemplary embodiment of the inventive concept.

FIG. 4 is a timing diagram illustrating an exemplary operation of the CMOS charge pump according to the inventive concept.

The operation of the CMOS charge pump according to an exemplary embodiment of the inventive concept will be described with reference to FIGS. 1 to 4. First, in a power-up period of operation (t0 to t1) of the CMOS charge pump, the inverted initialization signal INITB is maintained at a low level and the first level sensor 310 activates the clock enable signal clk_en in response to the boosted voltage Vout. The clock signal generator 330 generates and outputs the clock signal CLK in response to the clock enable signal clk_en. The second level sensor 320 activates and outputs the auxiliary circuit enable signal ENaux at a high level in response to the boosted voltage Vout. Since the inverted initialization signal INITB is applied at a low level, the main pumping signal Φ1 and the inverted main pumping signal Φ1B are maintained at levels of the ground voltage Vss and the power supply voltage Vdd, respectively, and the second boost node ND2 of the main pump 100 is temporarily pumped to the level of the power supply voltage Vdd by the second boost capacitor C2 to which the inverted main pumping signal Φ1 is applied, but quickly drops to the level of the ground voltage Vss.

The auxiliary pumping signal Φ2 and the inverted auxiliary pumping signal Φ2B are clocked with a period corresponding to the clock signal CLK in response to the auxiliary circuit enable signal ENaux and the clock signal CLK. Also, the pulse auxiliary pumping signal Φ2D is output as a pulse signal having a high level period shorter than the auxiliary pumping signal 12 in response to the auxiliary pumping signal Φ2.

The first and second auxiliary boost nodes ND3, ND4 of the auxiliary pump 210 are boosted to the 2Vdd level by the power supply voltage Vdd applied via the first and second auxiliary precharge transistors MN1, MN2 and the auxiliary pumping signal Φ2 and the inverted auxiliary pumping signal Φ2B applied via the first and second auxiliary capacitors C6, C7. The blocking-signal output transistor MN3 outputs the blocking signal BSC at a level of 2Vdd−Vthn in response to the voltage level of the first auxiliary boost node ND3. The transfer gate TG applies a voltage at the 2Vdd−Vthn level to the gate of the bulk-voltage output transistor MN4 in response to the voltage levels of the first and second auxiliary boost nodes ND3, ND4, and additionally applies a voltage at a Vdd level to the gate of the bulk-voltage output transistor MN4 in response to the pulse auxiliary pumping signal Φ2D. Accordingly, the voltage at the 3Vdd−Vthn level is applied to the gate of the bulk-voltage output transistor MN4, and the precharge bulk voltage at the 2Vdd level is applied to the bulk node NDbulk of the main pump 100 by the blocking-signal output transistor MN3 to precharge the bulk node NDbulk.

As such, during the power-up period, the main pump 100 does not perform a boosting operation while the auxiliary pump 210 performs the boosting operation to precharge the bulk node NDbulk of the main pump 100 to the 2Vdd level. Also, the auxiliary pump 210 applies the blocking signal at a 2Vdd−Vthn level to the gates of the first and second blocking transistors LP3, RP3 to deactivate the first and second blocking transistors LP3, RP3 and to disconnect the first and second boost nodes ND1, ND2 from the bulk node NDbulk. That is, the bulk voltage Vbulk is maintained at the 2Vdd level.

Following the power-up period of operation (t0~t1), the inverted initialization signal INITB is transitioned to a high level. However, since the voltage level of the boosted voltage Vout does not arrive at the 2Vdd−Vthn level, the second level sensor 320 maintains the auxiliary circuit enable signal ENaux at a high level. Since the inverted initialization signal INITB is applied at a high level, the main pumping signal Φ1 and the inverted main pumping signal (MB are clocked with a period corresponding to the clock signal CLK. As the main pumping signal Φ1 and the inverted main pumping signal Φ1B are clocked, the first and second boost nodes ND1, ND2 of the main pump 100 are boosted to the 2Vdd level by the power supply voltage Vdd applied via the first and second precharge transistors LN1, RN1 and the pumping signal c1 and the inverted auxiliary pumping signal Φ1B applied via the first and second boost capacitors C1, C2. The first and second transfer transistors LP1, RP1 alternately charge-share with the first and second boost nodes ND1, ND2 in response to the voltage levels of the second and first boost nodes ND2, ND1, which are pumped alternately, such that the voltage at the output node NDout increases and the boosted voltage Vout is output at the 2Vdd level. In this case, since the auxiliary pump 210 remains under the boosting operation, the voltage levels of the bulk voltage Vbulk and the blocking signal BSC are maintained in a state boosted in a power-up period. The blocking signal BSC is at the 2Vdd-Vthn level and the first and second boost nodes ND1, ND2 are boosted to the 2Vdd level, causing a gate-source voltage difference of Vthn that may be ignored due to insignificant current loss.

When the level of the boosted voltage Vout is above the 2Vdd-Vthn level due to the boosting operation of the main pump 100 (t2), the second level sensor 320 causes the auxiliary circuit enable signal ENaux to transition to a low level. Accordingly, the auxiliary pumping signal Φ1 and the pulse auxiliary pumping signal Φ2D are maintained at a low level, and the inverted auxiliary pumping signal Φ2B reaches a high level. As such, the auxiliary pump 210 stops the boosting operation, but the blocking control circuit 220 prevents the blocking signal BSC from dropping below the power supply voltage Vdd level irrespective of the level of the auxiliary circuit enable signal ENaux. In this case, since the inverted initialization signal INITB remains at a high level, the main pump 100 continues to perform the boosting operation in response to the main pumping signal Φ1 and the inverted main pumping signal Φ1B. As the first and second boost nodes ND1, ND2 are boosted to the 2Vdd level, the first and second blocking transistors LP3, RP3 are turned on, and the first and second bulk control transistors LP2, RP2 are turned on with the first and second transfer transistors LP1, RP1, such that the bulk voltage Vbulk is maintained at the same level as the boosted voltage Vout.

In an overload period (t3 to t4) in which the main pump 100 is overloaded and the voltage level of the boosted voltage Vout drops below the 2Vdd-Vthn level, the second level sensor 320 re-activates the auxiliary circuit enable signal ENaux at a high level in response to the boosted voltage Vout, and the auxiliary pump 210 performs the boosting operation again. As the auxiliary pump 210 performs the boosting operation again, the first and second blocking transistors LP3, RP3 can disconnect the first and second boost nodes ND1, ND2 from the bulk node NDbulk and the bulk voltage Vbulk can be maintained at the 2Vdd level.

As a result, the CMOS charge pump of the inventive concept first precharges the bulk voltage Vbulk before the main pump performs the boosting operation in the power-up period, and maintains the bulk voltage Vbulk at a predetermined level or higher in a subsequent period, preventing all the PMOS transistors in the CMOS charge pump from being forward biased. Accordingly, the latch-up phenomenon can be prevented.

Although the high level of each signal is considered to be the level of the power supply voltage Vdd and the low level is considered to be the level of the ground voltage Vss, the high and low levels may have any other values. Also, the level of each signal may be changed according to circuitry implementations.

Accordingly, a CMOS charge pump first precharges a bulk voltage before a main pump performs a boosting operation in a power-up period, and maintains the bulk voltage at a predetermined level or higher in a subsequent period, thereby preventing the PMOS transistors in the CMOS charge pump from being forward biased. Accordingly, the latch-up phenomenon can be prevented.

The foregoing is illustrative of exemplary embodiments and is not to be construed as limiting thereof. Although practical exemplary embodiments have been described, those skilled in the art will readily appreciate that many modifications are possible without materially departing from the inventive concept. Accordingly, all such modifications to the disclosed embodiments, as well as other embodiments, are intended to be included within the scope of the appended claims.

What is claimed is:

1. A complementary metal-oxide semiconductor (CMOS) charge pump comprising a main pump, wherein the main pump comprises:
   a boosting circuit configured to boost voltages at first and second boost nodes in response to a main pumping signal and an inverted main pumping signal;
   an output unit configured to output a boosted voltage, and comprising a first transfer PMOS transistor that applies the voltage at the first boost node to an output node in response to a voltage level of the second boost node and a second transfer PMOS transistor that applies the voltage at the second boost node to the output node in response to a voltage level of the first boost node;
   a bulk voltage adjustor configured to electrically connect a bulk node connected to bulks of the first and second transfer PMOS transistors to the output node in response to the voltage levels of the first boost node and the second boost node when a blocking control signal is deactivated, and to disconnect the first boost node and the second boost node from the bulk node when the blocking control signal is activated,
   a first level sensor configured to sense a voltage level of the boosted voltage and output a clock enable signal;
   a clock signal generator configured to generate and output a clock signal in response to the clock enable signal;
   a first AND gate configured to perform an AND operation on an inverted initialization signal and the clock signal and output the main pumping signal.

2. The CMOS charge pump of claim 1, wherein the bulk voltage adjustor connects the first boost node to the bulk node when the blocking control signal is deactivated and the voltage at the first boost node is higher than the voltage at the second boost node, and connects the second boost node to the bulk node when the blocking control signal is deactivated and the voltage at the second boost node is higher than the voltage at the first boost node.

3. The CMOS charge pump of claim 2, wherein the bulk voltage adjustor comprises:
   a first bulk control transistor having one terminal connected to the bulk node and a gate connected to the second boost node;
   a second bulk control transistor having one terminal connected to the bulk node and a gate connected to the first boost node;
   a first blocking transistor connected between the first boost node and the first bulk control transistor and having a gate receiving the blocking signal; and
   a second blocking transistor connected between the second boost node and the second bulk control transistor and having a gate receiving the blocking signal.

4. The CMOS charge pump of claim 3, wherein the first bulk control transistor, the second bulk control transistor, the first blocking transistor and the second blocking transistor are each PMOS transistors.

5. The CMOS charge pump of claim 4, wherein bulks of the first and second bulk control transistors and the first and second blocking transistors are connected to the bulk node.

6. The CMOS charge pump of claim 5, further comprising an auxiliary pump configured to precharge the bulk node in response to an auxiliary pumping signal, an inverted auxiliary pumping signal and a pulse auxiliary pumping signal and activate the blocking signal when the level of the boosted voltage is lower than a predetermined level.

7. The CMOS charge pump of claim 6, wherein the boosting circuit comprises:
   a first precharge transistor connected between a power supply voltage and the first boost node and having a gate connected to the second boost node;
   a second precharge transistor connected between the power supply voltage and the second boost node and having a gate connected to the first boost node;
   a first boost capacitor having one terminal connected to the first boost node and the other terminal receiving the main pumping signal; and
   a second boost capacitor having one terminal connected to the second boost node and the other terminal receiving the inverted main pumping signal.

8. The CMOS charge pump of claim 7, wherein the first precharge transistor and the second precharge transistor are NMOS transistors.

9. The CMOS charge pump of claim 8, wherein the auxiliary pump comprises:
   a first auxiliary precharge transistor connected between the power supply voltage and a first auxiliary boost node and having a gate connected to a second auxiliary boost node;
   a second auxiliary precharge transistor connected between the power supply voltage and the second auxiliary boost node and having a gate connected to the first auxiliary boost node;
   a first auxiliary capacitor having one terminal connected to the first auxiliary boost node and the other terminal receiving the auxiliary pumping signal;
   a second auxiliary capacitor having one terminal connected to the second auxiliary boost node and the other terminal receiving the inverted auxiliary pumping signal;
   a blocking signal output transistor having one terminal and a gate connected to the first auxiliary boost node and the other terminal outputting the blocking signal;
   a bulk voltage output transistor connected between the first auxiliary boost node and the bulk node and precharging the bulk node;
   a third auxiliary capacitor having one terminal connected to a gate of the bulk voltage output transistor and the other terminal receiving the pulse auxiliary pumping signal; and
   a transfer gate connected between the first auxiliary boost node and the gate of the bulk voltage output transistor and implemented by two NMOS transistors having respective gates connected to the first and second auxiliary boost node.

10. The CMOS charge pump of claim 9, wherein the first auxiliary precharge transistor, the second auxiliary precharge transistor, the blocking signal output transistor and the hulk voltage output transistor are each NMOS transistors.

11. The CMOS charge pump of claim 10, further comprising a control signal generator, wherein the control signal generator further comprises:
   a second level sensor configured to sense the voltage level of the boosted voltage and output an auxiliary circuit enable signal;
   a first inverter configured to invert the main pumping signal and output the inverted main pumping signal;
   a second AND gate configured to perform an AND operation on the auxiliary circuit enable signal and the clock signal and output the auxiliary pumping signal;
   a second inverter configured to invert the auxiliary pumping signal and output the inverted auxiliary pumping signal;
   a delay element configured to delay the auxiliary pumping signal;
   a third inverter configured to invert an output signal of the delay element; and
   a third AND gate configured to perform an AND operation on the auxiliary pumping signal and the output signal of the third inverter and output the pulse pumping signal,
   wherein the inverted initialization signal transitions to a high level in a predetermined time after the power supply voltage is applied to the CMOS charge pump.

12. The CMOS charge pump of claim 11, further comprising a blocking control circuit, wherein the blocking control circuit comprises:
   a fourth inverter configured to invert the auxiliary circuit enable signal;
   a first PMOS transistor having one terminal connected to the power supply voltage and the other terminal outputting the blocking control signal;
   a second PMOS transistor having one terminal connected to the other terminal of the first PMOS transistor, the other terminal connected to the gate of the first PMOS transistor, and a gate receiving an output signal of the fourth inverter;
   a first NMOS transistor having one terminal connected to the other terminal of the second PMOS transistor, and a gate connected to the power supply voltage; and
   a second NMOS transistor connected between the first NMOS transistor and a ground voltage and having a gate receiving an output signal of the fourth inverter.

13. The CMOS charge pump of claim 11, further comprising:
   an output capacitor connected between the output node and the ground voltage; and
   a bulk capacitor connected between the bulk node and the ground voltage.

14. A CMOS charge pump comprising:
   a main charge pump having an output node for providing a boosted voltage in response to a main pumping signal and an inverted main pumping signal;
   an auxiliary charge pump coupled to the main charge pump;
   a first level sensor configured to sense a voltage level of the boosted voltage and output a clock enable signal;
   a control signal generator for providing respective control signals to the main charge pump and to the auxiliary charge pump, the clock signal generator configured to generate and output a clock signal in response to the clock enable signal;
   a first AND gate configured to perform an AND operation on an inverted initialization signal and the clock signal and output the main pumping signal,
   wherein the main charge pump comprises:
      first and second boost nodes coupled to the output node;

a bulk node coupled to the output node; and a blocking transistor configured to disconnect the first and second boost nodes from the bulk node in response to a blocking control signal from the auxiliary charge pump, such that a bulk voltage at the bulk node can be maintained at a predetermined level or higher.

15. The CMOS charge pump of claim 14, wherein the auxiliary charge pump in a power-up period precharges the bulk voltage before the main charge pump performs a boosting operation.

* * * * *